(12) United States Patent
Deniston et al.

(10) Patent No.: US 7,726,275 B2
(45) Date of Patent: Jun. 1, 2010

(54) SYSTEM AND METHOD FOR POWERING A MECHANICALLY DRIVEN ACCESSORY COMPONENT IN AN AUTOMOTIVE VEHICLE

(75) Inventors: Paul Michael Deniston, Westland, MI (US); Paul M. Gartner, Oshtemo, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 204 days.

(21) Appl. No.: 11/776,720

(22) Filed: Jul. 12, 2007

(65) Prior Publication Data
US 2009/0013952 A1    Jan. 15, 2009

(51) Int. Cl.
*F02B 61/04* (2006.01)
*F16H 7/00* (2006.01)

(52) U.S. Cl. .......................... 123/198 R; 123/198 C; 474/87

(58) Field of Classification Search ............. 123/198 C, 123/198 R, 195 A, 198 D, 179.4, 179.3; 62/323.4, 62/323.3; 180/53.8; 477/3; 701/36; 474/87
See application file for complete search history.

(56) References Cited

U.S. PATENT DOCUMENTS

| | | | |
|---|---|---|---|
| 6,048,288 A | 4/2000 | Tsujii et al. | |
| 6,396,165 B1 | 5/2002 | Nagano et al. | |
| 6,464,028 B1 | 10/2002 | Imani | |
| 6,651,450 B1 | 11/2003 | Tamegai et al. | |
| 6,668,953 B1 | 12/2003 | Reik et al. | |
| 6,768,215 B2 | 7/2004 | Souki et al. | |
| 6,817,330 B1 * | 11/2004 | Ogawa et al. | 123/179.4 |
| 7,032,393 B2 | 4/2006 | Tamai et al. | |
| 2003/0005784 A1 | 1/2003 | Schnelle et al. | |
| 2003/0173783 A1 | 9/2003 | Berels | |
| 2007/0130950 A1 | 6/2007 | Serkh et al. | |

FOREIGN PATENT DOCUMENTS

| | | |
|---|---|---|
| DE | 19703209 C1 | 7/1998 |
| DE | 20000343 U1 | 3/2000 |
| GB | 2383313 A | 6/2003 |
| JP | 09324668 | 12/1997 |
| JP | 2002122217 | 4/2002 |
| WO | 2008113186 A1 | 9/2008 |

OTHER PUBLICATIONS

Office Action in German Application No. 10 2008 023 834.1-21 (and English translation thereof), Dec. 4, 2009.

* cited by examiner

*Primary Examiner*—Noah Kamen
(74) *Attorney, Agent, or Firm*—David B. Kelley; Brooks Kushman P.C.

(57) ABSTRACT

A belt integrated starter generator may selectively drive accessory components while an engine is off. The belt integrated starter generator may also selectively drive a crankshaft of the engine. Clutches are used to access rotational power from the belt.

7 Claims, 2 Drawing Sheets

SYSTEM AND METHOD FOR POWERING A MECHANICALLY DRIVEN ACCESSORY COMPONENT IN AN AUTOMOTIVE VEHICLE

BACKGROUND OF THE INVENTION

1. Field of the Invention

The invention relates to systems and methods for powering mechanically driven accessory components in automotive vehicles.

2. Discussion

Hybrid technologies may be grouped into "full hybrid" and "micro-hybrid technologies." Full hybrid technologies may contain electric machines capable of independently delivering torque to the wheels and providing propulsion to the vehicle independent of the internal combustion engine. Micro-hybrid technologies may contain Integrated Starter Generator (ISG) machines that are not capable of propelling the vehicle but are capable of supporting a rapid start of the engine as well as on/off operation of the engine while the vehicle is stationary.

In conventional ISG based micro-hybrids, the ISG may be placed in series with the internal combustion engine and transmission system. The ISG takes the place of the traditional engine starter as well as the traditional alternator/generator that generates electric power for accessories and battery storage. The ISG may allow the engine to go from zero rpm to several hundred rpm in a fraction of a second, thus providing seamless start-stop capability to the driver in addition to fuel economy and reduced tailpipe emissions benefits.

SUMMARY

Embodiments of the invention may take the form of a system for powering an accessory component of a vehicle. The system includes an engine including a crankshaft, an electric motor, and a mechanically driven accessory component. The electric motor and crankshaft are configured to be selectively mechanically coupled. The electric motor and accessory component are configured to be selectively mechanically coupled.

Embodiments of the invention may take the form of a system for powering an accessory component of a vehicle. The vehicle includes an engine having a crankshaft and an electric motor. The system includes a belt, first and second clutches, and a mechanically driven accessory component. The electric motor and crankshaft are configured to be selectively mechanically coupled via the belt and the first clutch. The electric motor and accessory component are configured to be selectively mechanically coupled via the belt and the second clutch.

Embodiments of the invention may take the form of a method for powering a mechanically driven accessory component in a vehicle including an engine having a crankshaft, an electric motor, and a mechanically driven accessory component. The electric motor and crankshaft are configured to be selectively mechanically coupled. The electric motor and accessory component are configured to be selectively mechanically coupled. The method includes mechanically de-coupling the electric motor and crankshaft, mechanically coupling the electric motor and accessory component, and providing mechanical power from the electric motor to the accessory component.

DETAILED DESCRIPTION

A conventional ISG based micro-hybrid may be unable to maintain interior climate comfort levels while the engine is off because the air conditioning (A/C) compressor is located on the Front End Accessory Drive (FEAD) system and does not run while the engine is shut-off. Hence, in hot ambient conditions, a choice must be made as to whether to honor the fuel economy savings by shutting off the engine or to provide a comfortable cabin temperature for the driver by running the engine.

Embodiments of the invention overcome the interior comfort issue by providing a means for driving the A/C compressor while the internal combustion engine is not spinning: an ISG may be put on the FEAD. This Belt Integrated Starter Generator (BISG) is connected to the front of the engine and one or more FEAD accessory devices via the accessory belt that is used by traditional internal combustion engine technologies to drive one or more accessory devices on the FEAD. Such devices may include the alternator and the power steering pump. The BISG architecture allows the engine controller to selectively shut off the engine while the vehicle is not moving and then rapidly re-start the engine when the driver desires power to the wheels for the purpose of moving the vehicle.

In some embodiments, the crank-shaft pulley on the engine is a clutch driven device as opposed to being permanently coupled to the crankshaft. The added clutch allows for the decoupling of the crankshaft pulley from the engine crankshaft. This allows the use of the existing FEAD belt system and the existing clutches on the accessory drives, e.g., the A/C compressor, by the BISG device. In one application, the engine system is desired to be off for fuel economy during hot ambient temperatures while the driver desires interior cooling. By decoupling the crank pulley from the crankshaft, the BISG can continue to drive the A/C compressor, thus enabling continued interior comfort.

Figure 1:
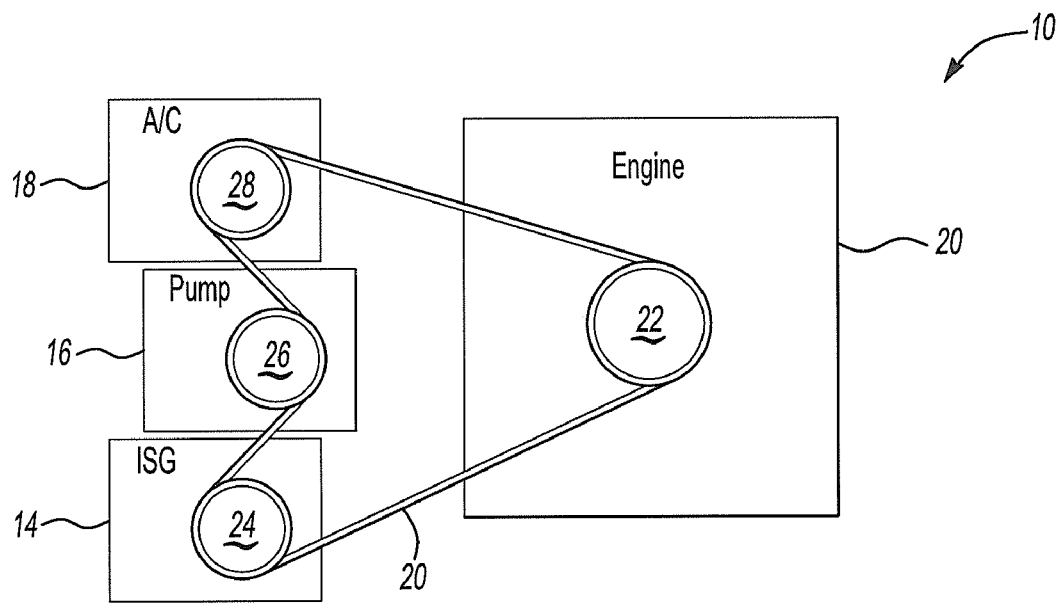
FIG. 1 is a block diagram, front view, of a belt integrated starter generator system in accordance with an embodiment of the invention and shows an engine, integrated starter generator, and accessory devices driven by a common belt.

FIG. 1 is a block diagram, front view, of a belt integrated starter generator system 10. Engine 12, motor 14, e.g., integrated starter generator, pump 16, e.g., water pump, power steering pump, and air conditioning compressor 18 selectively share serpentine belt 20 via pulleys 22, 24, 26, 28 respectively.

Figure 2:
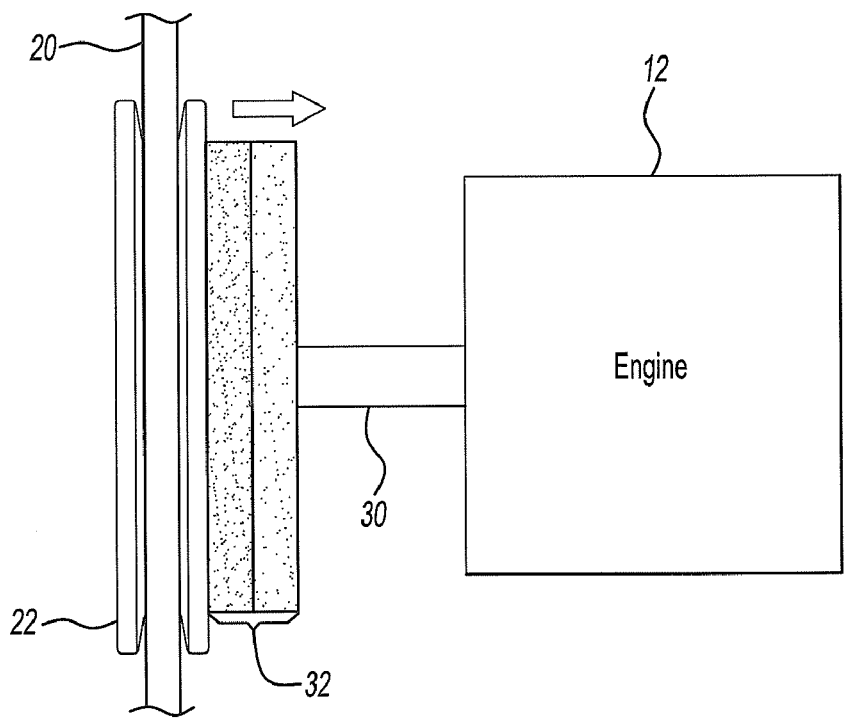
FIG. 2 is a block diagram, side view, of the engine of FIG. 1 and shows a crankshaft engaged with the common belt via a clutch.

FIG. 2 is a block diagram, side view, of engine 12 and pulley 22. Crankshaft 30 may selectively engage pulley 22 via clutch 32. Clutch 32 is shown in the engaged position. If clutch 32 is in the engaged position, engine 12 receives/ provides rotational power from/to serpentine belt 20. If clutch 32 is in the disengaged position, engine 12 does not receive/provide rotational power from/to serpentine belt 20.

Figure 3:
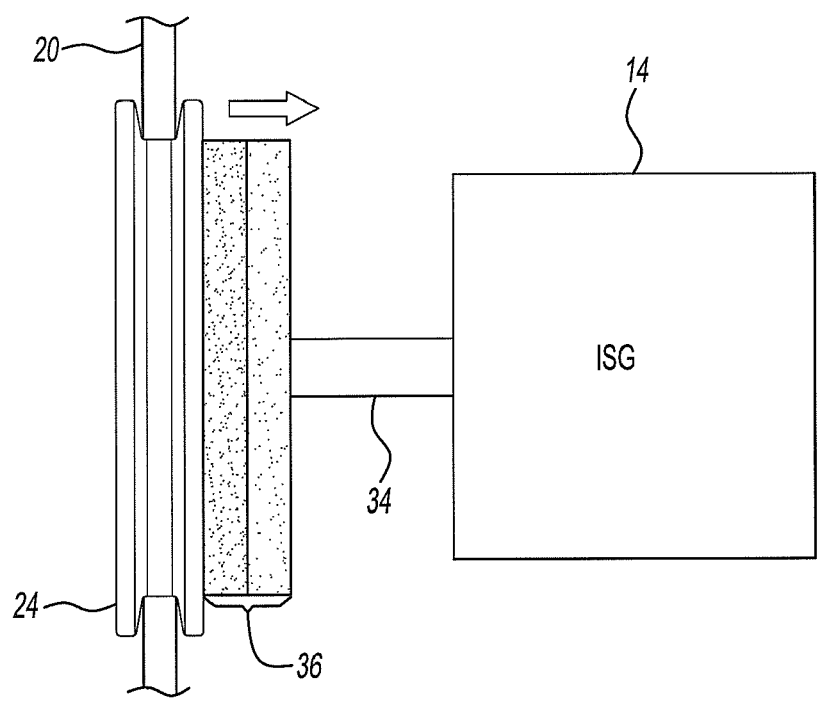
FIG. 3 is a block diagram, side view, of the integrated starter generator of FIG. 1 and shows the integrated starter generator engaged with the common belt via a clutch.

FIG. 3 is a block diagram, side view, of motor 14 and pulley 24. Power shaft 34 may selectively engage pulley 24 via clutch 36. Clutch 36 is shown in the engaged position. If clutch 36 is in the engaged position, motor 14 provides rotational power to serpentine belt 20. If clutch 36 is in the disengaged position, motor 14 does not provide rotational power to serpentine belt 20.

Figure 4:
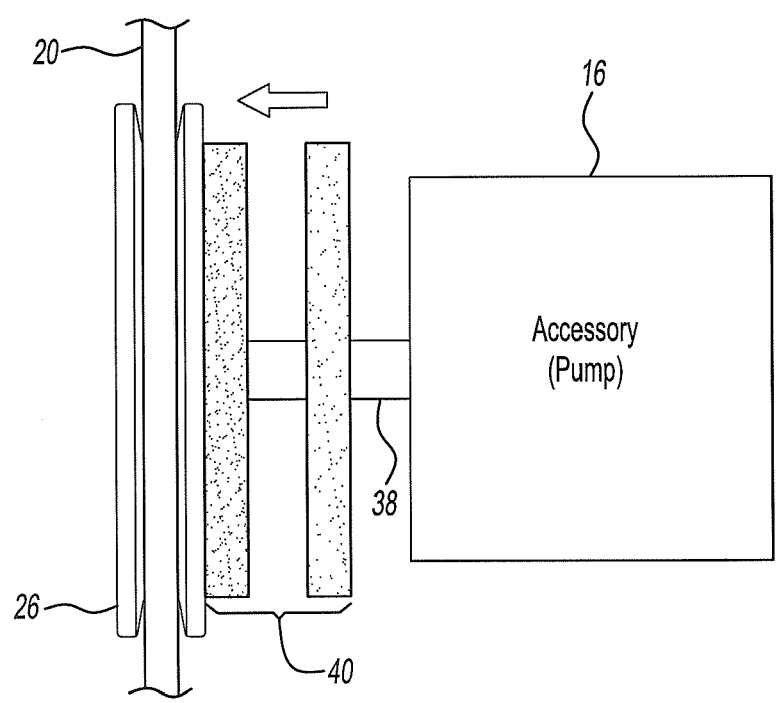
FIG. 4 is a block diagram, side view, of the pump of FIG. 1 and shows the pump disengaged with the common belt via a clutch.

FIG. 4 is a block diagram, side view, of pump 16 and pulley 26. Power shaft 38 may selectively engage pulley 26 via clutch 38. Clutch 38 is shown in the disengaged position. If clutch 40 is in the engaged position, pump 16 receives rotational power from serpentine belt 20. If clutch 40 is in the disengaged position, pump 16 does not receive rotational power from serpentine belt 20. Air conditioning compressor 18 and pulley 28 have a clutch configuration similar to that of pump 18 and pulley 26.

Referring to FIGS. 1-4, to start engine 12, clutches 32, 36 would be engaged and clutch 40 would be disengaged. Motor 14 thus drives serpentine belt 20. If engine 12 is running and pump 16 requires mechanical power, clutch 32 would be disengaged and clutches 36, 40 would be engaged. Motor 14 thus drives serpentine belt 20. If engine 12 is running and pump 16 requires mechanical power, clutches 32, 40 would be engaged and clutch 36 would be disengaged. Engine 12 thus drives serpentine belt 20.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. An automotive accessory component power system comprising:
   a belt;
   first, second and third clutches;
   an engine including a crankshaft adapted to be selectively mechanically coupled with the belt via the first clutch;
   an electric motor adapted to be selectively mechanically coupled with the belt via the second clutch; and
   a mechanically driven accessory component adapted to be selectively mechanically coupled with the belt via the third clutch.

2. The system of claim 1 wherein the belt is a serpentine belt.

3. The system of claim 1 wherein the electric motor is a belt integrated starter generator.

4. The system of claim 1 wherein the mechanically driven accessory component comprises an air conditioning compressor.

5. The system of claim 1 wherein the mechanically driven accessory component comprises a power steering pump.

6. The system of claim 1 wherein the mechanically driven accessory component comprises a water pump.

7. A method for powering a mechanically driven accessory component of an automotive accessory power system including a belt, first, second and third clutches, an engine having a crankshaft adapted to be selectively mechanically coupled with the belt via the first clutch, an electric motor adapted to be selectively mechanically coupled with the belt via the second clutch, and a mechanically driven accessory component adapted to be selectively mechanically coupled with the belt via the third clutch, the method comprising:
   mechanically de-coupling the crankshaft from the belt via the first clutch;
   mechanically coupling the electric motor to the belt via the second clutch;
   mechanically coupling the accessory component to the belt via the third clutch; and
   providing mechanical power from the electric motor to the accessory component via the belt.

* * * * *